(12) United States Patent
Kouda

(10) Patent No.: US 8,212,449 B2
(45) Date of Patent: Jul. 3, 2012

(54) STATOR FOR ROTARY ELECTRIC MACHINE AND METHOD OF MANUFACTURING THE STATOR

(75) Inventor: Shinji Kouda, Kariya (JP)

(73) Assignee: Denso Corporation, Kariya (JP)

( * ) Notice: Subject to any disclaimer, the term of this patent is extended or adjusted under 35 U.S.C. 154(b) by 245 days.

(21) Appl. No.: 12/749,726

(22) Filed: Mar. 30, 2010

(65) Prior Publication Data
US 2010/0244615 A1 Sep. 30, 2010

(30) Foreign Application Priority Data

Mar. 31, 2009 (JP) .................................. 2009-086429
Mar. 5, 2010 (JP) ................................ 2010-049025

(51) Int. Cl.
*H02K 3/32* (2006.01)

(52) U.S. Cl. .................................. 310/215; 174/120 SR

(58) Field of Classification Search .................. 310/196, 310/215; 174/110 N, 110 PM, 120 R, 120 SR, 174/121 R, 127, DIG. 22, DIG. 29; 336/205, 336/206; 29/596–598
See application file for complete search history.

(56) References Cited

U.S. PATENT DOCUMENTS

| | | | |
|---|---|---|---|
| 3,891,880 A * | 6/1975 | Britsch | 310/196 |
| 4,400,676 A * | 8/1983 | Mitsui | 336/205 |
| 4,473,765 A * | 9/1984 | Butman et al. | 310/215 |
| 6,147,430 A * | 11/2000 | Kusase et al. | 310/215 |
| 6,177,747 B1 * | 1/2001 | Maeda et al. | 310/179 |
| 6,873,082 B2 * | 3/2005 | Neet | 310/215 |
| 6,922,001 B2 * | 7/2005 | Neet et al. | 310/215 |
| 7,081,697 B2 * | 7/2006 | Neet | 310/216.011 |

FOREIGN PATENT DOCUMENTS

| | | |
|---|---|---|
| JP | 56-057645 | 5/1981 |
| JP | 03-270657 | 12/1991 |
| JP | 04-208040 | 7/1992 |

* cited by examiner

*Primary Examiner* — Tran Nguyen
(74) *Attorney, Agent, or Firm* — Nixon & Vanderhye PC

(57) ABSTRACT

A stator core for a rotary electric machine is provided. The stator includes an annular stator core having a plurality of slots punched and arranged in the circumferential direction, being straight in the axial direction, and a stator winding consisting of wire members. The wire members have respective straight portions accommodated in respective slots. Each of the wire members has a conductor portion having a rectangular cross section and an insulating coating covering the conductor portion. An adhesive member is provided between each of the straight portions and the wall surface of each slot. In each slot, the adhesive member adheres the straight portions to the wall surface. Thus, the stator core can maintain the space factor of the wire members accommodated in each slot and suppress vibration of the wire members during the operation of the rotary electric machine to reliably reduce generation of peculiar noise or magnetic noise.

18 Claims, 11 Drawing Sheets

ABOUT 3 m

STATOR FOR ROTARY ELECTRIC MACHINE AND METHOD OF MANUFACTURING THE STATOR

CROSS-REFERENCE TO RELATED APPLICATION

This application is based on and claims the benefit of priority from earlier Japanese Patent Application Nos. 2009-086429 and 2010-049025 filed Mar. 31, 2009 and Mar. 5, 2010, respectively, the descriptions of which are incorporated herein by reference.

BACKGROUND OF THE INVENTION

1. Technical Field of the Invention

The present invention relates to a stator for a rotary electric machine which is used as a motor or a generator in a vehicle, for example, and relates to a method of manufacturing the stator.

2. Related Art

Various stators for rotary electric machines have been known, which are used in vehicles. One of these known stators includes a stator comprising an annular stator core that has a plurality of slots in the circumferential direction, and a stator winding formed of wire members that are wound about the stator core with a plurality of portions of the wire members being stacked and disposed in the respective slots. A rotary electric machine provided with such a stator has suffered from a rasping and peculiar noise or magnetic noise ascribed to the vibration of the stator core, which vibration is induced by the vibration of the stator winding during the operation of the rotary electric machine. To take measures against such a problem of peculiar noise or magnetic noise, several suggestions have been made.

For example, patent document JP-A-H03-270657 discloses that a thermoplastic resin is impregnated in an insulating sheet interposed between the peripheral wall surface of each slot of a stator core and the wire members accommodated in the slot. The patent document further discloses that only the portions of the wire members located inside the insulating sheet are connected to each other by the thermoplastic resin that has been heated and melted, while these portions are also connected to the insulating sheet.

Patent document JP-A-H04-208040 discloses that an insulating sheet made of a vibration-damping insulating material is interposed between the peripheral wall surface of each slot and the wire members in the slot to attenuate the vibration of the wire members in the slot.

However, regarding the technique disclosed in the patent document JP-A-H03-270657, the thermoplastic resin is required to have a very high expansion coefficient in order to have the thermoplastic resin fully distributed between the portions of the wire members each having a circular cross section and adjacently located in each slot. In addition, since the positions of each of the portions of the wire members are difficult to control, the wire members are likely to come into contact with the stator core, causing insulation failure.

Regarding the technique disclosed in the patent document JP-A-H04-208040, the insulating sheet made of the vibration-damping insulating material is required to have a certain thickness in order to obtain a satisfactory attenuation effect by the insulating sheet, leading to lowering of the space factor. The term "space factor" refers to a proportion of an area occupied by wire members in a cross section of a slot. The space factor is obtained using a formula; (Total cross section of wire members disposed in a slot)/(Cross section of the slot).

SUMMARY OF THE INVENTION

The present invention has been made in light of the problems set forth above and has as its object to provide a stator for a rotary electric machine, which is able to improve the space factor of the wire members disposed in each slot and more reliably reduce the generation of peculiar or magnetic noise by suppressing the vibration of the wire members generated during the operation of the rotary electric machine, and to provide a method of manufacturing the stator.

According to a first aspect of the present invention, the stator comprises: an annular stator core that provides an axial direction along a center axis of the annular stator core, a radial direction radiating out from the axial direction into directions along a plane perpendicular to the axial direction, and a circumferential direction circulating around the axial direction centering on the axial direction, the annular stator core having a plurality of slots punched along the radial direction and arranged in the circumferential direction, each extending, for example, straight in the axial direction; and a stator winding formed by winding a plurality of wire members about the stator core, the wire members each including a conductor portion that has a rectangular cross section perpendicular to a longitudinal direction, and an insulating coating that covers an outer periphery of the conductor portion, with a plurality of straight portions (hereinafter also referred to as "slot accommodation portions") of the wire members being accommodated and aligned in the radial direction in each slot, wherein; the stator comprises an adhesive member (composed of an adhesive material or an adhesive layer) interposed between at least one straight portion among the plurality of straight portions accommodated in each slot and a surface of the slot to adhere the straight portion concerned to the stator core; and the adhesive member has a three-layer structure consisting of an insulating layer and adhesive layers laminated on both surfaces of the insulating layer.

Thus, the wire members used in this configuration each include the conductor portion having a rectangular cross section and the insulating coating covering the outer periphery of the conductor portion. Accordingly, the space factor of the wire members disposed in each slot can be maintained at a high level. Also, the adhesive member disposed between at least one wire member (i.e. the straight portion or the slot accommodation portion) accommodated in each slot and the stator core can adhere the wire member to the stator core. Therefore, the wire member is adhered to the stator core to thereby suppress the occurrence of vibration in the wire member during the operation of the rotary electric machine. Accordingly, generation of rasping and peculiar noise or magnetic noise can be reliably reduced.

The adhesive member used in the present invention may be made of thermoplastic resins or thermosetting resins. The thermoplastic resins include PET, PPS and PEN. The thermosetting resins include epoxies and polyesters. It is preferred that these adhesive members have thermally expandable properties. Thermal expansion of such an adhesive member can permit the adhesive member to fill the gap between each of the wire members and the stator core, thereby avoiding adhesion failure between the wire members and the stator core. The adhesive member having thermally expandable properties which can be preferably used in the present invention may be obtained by mixing beads, each sealing a gas therein, into an acryl or the like that is a thermoplastic resin.

According to a second aspect of the present invention, planes through which the adhesive member and the straight portions are adhered to each other are aligned in the radial direction.

With this configuration, the adhesion planes through which the adhesive member and each of the wire members contact with each other are aligned in the radial direction with respect to the stator core and are opposed to the adhesion plane through which the adhesive member and the stator core (wail surface of each slot) contact with each other. Thus, the adhesion area of the adhesive member can be increased while the shape of the adhesive member can be simplified.

According to a third aspect of the present invention, the adhesive member in each slot is adhered to at least two faces in the circumferential direction of each straight portion.

With this configuration, the adhesion strength of the wire members against the stator core can be well ensured. Therefore, the wire members can be strongly fixed to the stator core. Thus, the wire members (the stator winding) become immovable against the force in the rotational direction that may act on the stator core during the operation of the rotary electric machine. As a result, generation of rasping and peculiar noise or magnetic noise can be reliably reduced.

According to a fourth aspect of the present invention, the adhesive member is disposed along a wall surface of each slot so as to be in contact with the wall surface and the plurality of straight portions, being shaped into a form having a U-shaped cross section perpendicular to the axial direction.

Thus, the adhesion area of the adhesive member can be increased while the shape of the adhesive member can be simplified.

According to a fifth aspect of the present invention, the stator comprises a different adhesive member interposed between the straight portions adjacent to each other in the radial direction in each slot to adhere the adjacent straight portions to each other.

Since the adjacently located wire members are adhered to each other via the adhesive member in this configuration, relative displacement between the adjacently located wire members can be reliably constrained. Thus, the relative displacement of the wire members (the stator winding) against the stator core can be reliably prevented in the event the force in the rotational direction acts on the stator core during the operation of the rotary electric machine. As a result, generation of rasping and peculiar noise or magnetic noise can be reliably reduced.

According to a sixth aspect of the present invention, a thickness of the different adhesive member disposed between the adjacent straight portions is equal to or less than that of the adhesive member disposed between the straight portions and the wall surface of the slot.

With this configuration, the thickness of the adhesive member disposed between the opposed faces of the adjacently located wire members can be reduced. Therefore, the space efficiency of the plurality of wire members disposed in each slot can be improved. As a result, the space factor can be prevented from lowering.

According to a seventh aspect of the present invention, the wire members each include a fusing material that covers an outer periphery of the insulating coating.

With this configuration, the outer layer of the insulating coating is crystallized faster than the inner layer by the heat generated in the rotary electric machine. Accordingly, the hardness of the outer layer is enhanced, whereby the wire members become unlikely to be damaged.

According to an eighth aspect of the present invention, the wire members each include a fusing material that covers an outer periphery of the insulating coating.

The fusing material here refers to a material which fuses by heating and solidifies by cooling. With this configuration, the wire members disposed in the same one slot can be easily thermally adhered to each other by the fusing material. As a result, the plurality of wire members disposed in the same one slot are integrated to enhance the mechanical strength of the wire members in the slot. Thus, the occurrence of vibration in the wire members can be effectively suppressed.

According to a ninth aspect of the present invention, the wire members each have turn portions each connecting the straight portions projected out of both end portions in the axial direction of each of the plurality of slots, the turn portions being positioned outside in the axial direction of each of the end portions, in addition to the straight portions accommodated in each of the plurality of slots provided at different positions in the circumferential direction; and the turn portions each have base portions projected out of each of the plurality of slots, the base portions each being formed with a step portion extending substantially parallel to an end face of the stator core.

With this configuration, the step portions are formed at the respective projected base portions of each turn portion projecting from the slots, the step portions each being substantially parallel to the end face of the stator core. Therefore, the distance between the projected base portions of each turn portion becomes smaller than the distance between the slots in which the wire member concerned is disposed. Accordingly, the shape of each wire member projected from the stator core becomes smaller. As a result, the height of the portion of the stator winding projected radially outward from each of the end faces of the stator core (hereinafter referred to as "cell end") will be reduced. Thus, the hardness of each coil end can be enhanced, thereby suppressing vibration of the wire members and reliably reducing generation of rasping and peculiar noise or magnetic noise.

According to a tenth aspect of the present invention, a method of manufacturing the stator described above is provided. The method comprises steps of: fabricating a cylindrical stator winding using the plurality of wire members such that the straight portions of the plurality of wire members to be accommodated in the same one slot of the stator core are aligned in the radial direction; disposing a thermally expandable adhesive sheet having a thickness smaller than a gap between each of the plurality of straight portions and a wall surface defining each slot, the gap being formed when the straight portions are accommodated in the slot, the adhesive sheet being disposed along the wall surface of the slot or around the plurality of straight portions aligned in the radial direction; assembling the stator winding and the stator core such that the plurality of straight portions are accommodated in the slot determined in advance; and adhering the plurality of straight portions to the wall surface via the adhesive sheet by heating and expanding the adhesive sheet for the elimination of the gap between each of the plurality of straight portions and the wall surface of each slot.

With this method, the vibration can be suppressed from occurring in the wire members disposed in each slot, which vibration occurs during the operation of the rotary electric machine, while the space factor of the wire member can be improved. Thus, the stator for a rotary electric machine can be easily manufactured, with reliable reduction in the generation of rasping and peculiar noise or magnetic noise.

According to an eleventh aspect of the present invention, a method of manufacturing the stator described above is provided. The method comprises steps of: fabricating a cylindrical stator winding using the plurality of wire members such that the straight portions of the plurality of wire members to be accommodated in the same one slot of the stator core are aligned in the radial direction; disposing an adhesive sheet having a thickness larger than a gap between each of the plurality of straight portions and a wall surface defining each slot, the gap being formed when the straight portions are accommodated in the slot, the adhesive sheet being disposed along the wall surface of the slot or around the plurality of straight portions aligned in the radial direction; assembling the stator winding and the stator core such that the plurality of straight portions are press-fitted to and accommodated in the slot determined in advance; and adhering the plurality of straight portions to the wall surface via the adhesive sheet by heating for melting, or solidifying the adhesive sheet.

With this method, the vibration can be suppressed from occurring in the wire members disposed in each slot, which vibration occurs during the operation of the rotary electric machine, while the space factor of the wire member can be improved. Thus, the stator for a rotary electric machine can be easily manufactured, while the generation of rasping and peculiar noise or magnetic noise can be reduced reliably.

DETAILED DESCRIPTION OF THE PREFERRED EMBODIMENTS

With reference the accompanying drawings, hereinafter will be described some embodiments of a stator for a rotary electric machine of the present invention.

(First Embodiment)

Figure 1A:
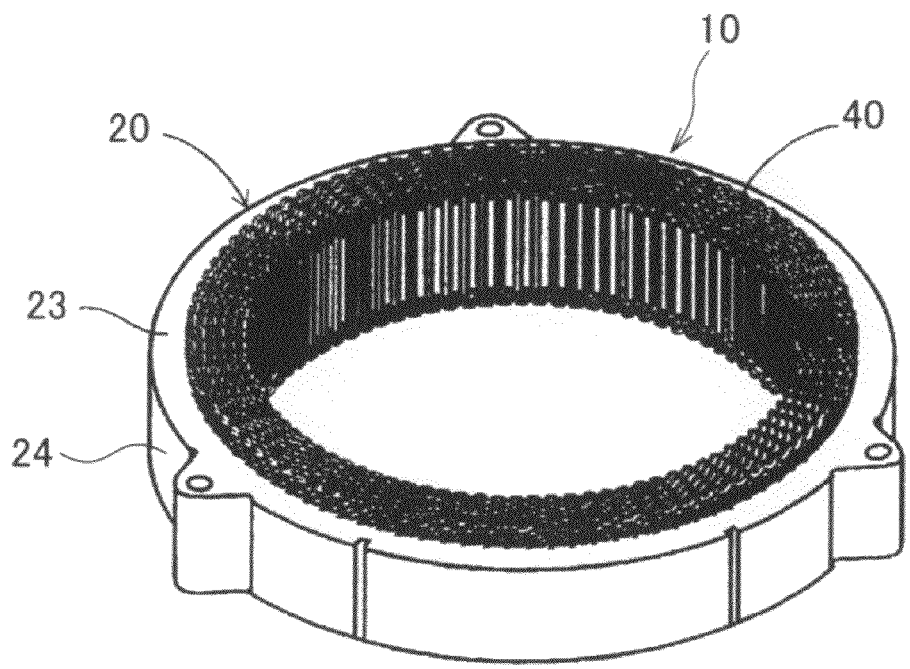
FIG. 1A is a perspective view illustrating an appearance of a stator for a rotary electric machine, according to a first embodiment of the present invention.
Figure 1B:
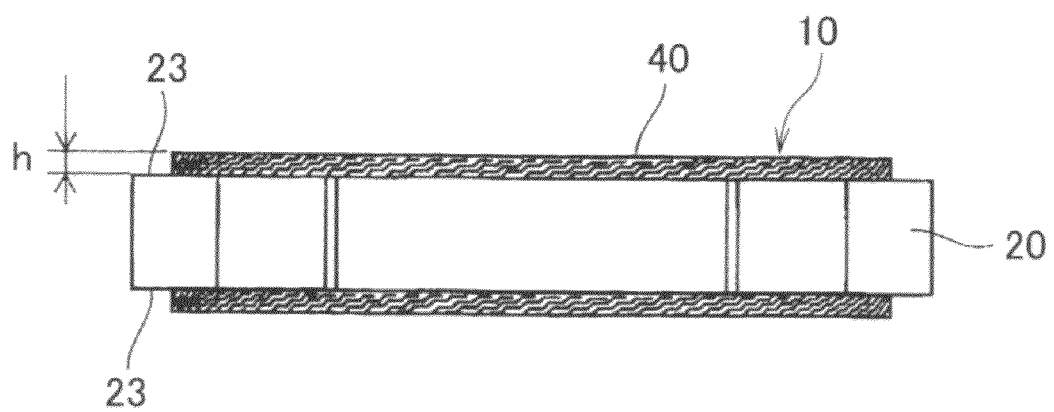
FIG. 1B is a side view illustrating the stator.
Figure 2:
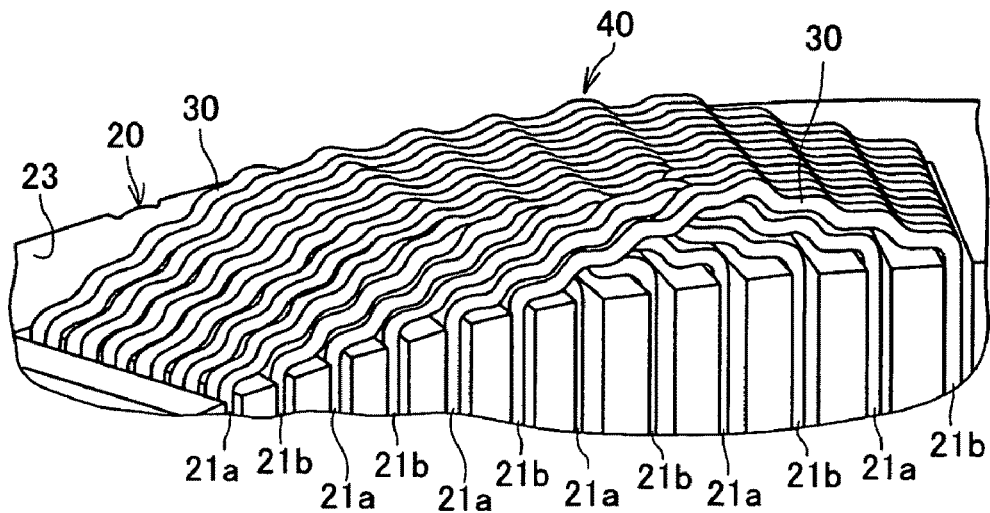
FIG. 2 is a partially enlarged perspective view illustrating the stator.

Referring to FIGS. 1 to 8A and FIGS. 9 to 15, hereinafter is described a first embodiment of the present invention. FIG. 1A is a perspective view illustrating an appearance of a stator 10 for a rotary electric machine, according to the first embodiment. FIG. 1B is a side view illustrating the stator 10. FIG. 2 is a partially enlarged perspective view illustrating the stator 10.

The stator 10 shown in FIG. 1 is used for a rotary electric machine as a motor-generator that serves both as a motor and a generator for a vehicle, for example. As a matter of course, this rotary electric machine may be a motor or a generator installed in a vehicle.

The stator 10 rotatably accommodates a rotor (not shown) in its interior. The rotor has an outer periphery in which a plurality of magnetic poles are formed being alternately differentiated in the circumferential direction and being opposed to the inner periphery of the stator 10. The number of magnetic poles of the rotor depends on the type of the rotary electric machine. In the present embodiment, eight-pole (four N poles and four S poles) rotor is used.

The stator 10 of the present embodiment includes a stator core 20 in which a plurality of slots 21 are formed, and includes a three-phase stator winding 40 made up of a plurality of wire members 30. As shown in FIG. 2, axially extending and circumferentially adjacent slots 21a and 21b are paired. A plurality of such pairs of slots are formed in the circumferential direction in the inner periphery of the stator core 20. The stator winding 40 is a three-phase winding. Specifically, the stator winding imparted with individual phases is disposed in circumferentially adjacent pairs of slots 21a and 21b. More specifically, three circumferentially adjacent pairs of slots 21a and 21b are provided with the stator winding imparted with different phases.

Figure 3:
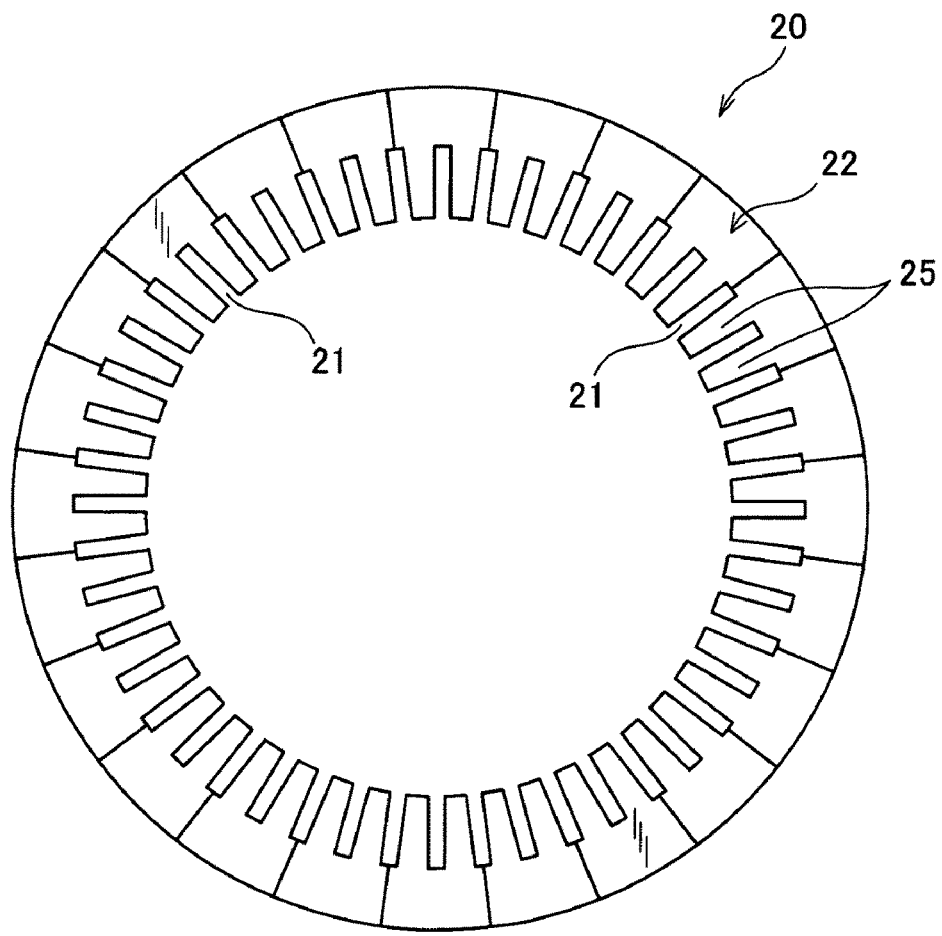
FIG. 3 is a plan view illustrating a stator core of the stator.

FIG. 3 is a plan view illustrating the stator core 20 of the stator 10. As shown in FIG. 3, the stator core 20 has an annular shape with its inner periphery being formed with the plurality of slots 21. Each of the plurality of slots 21 is formed so that its depth-wise direction coincides with the radial direction. The slots 21 are formed in the stator core 20 such that the number of slots 21 will be two per phase of the stator winding 40, for the number of magnetic poles of the rotor. In the present embodiment, forty-eight slots are formed as calculated as:

8(poles)×3(phases)×2(slots)=48(slots).

Figure 4:
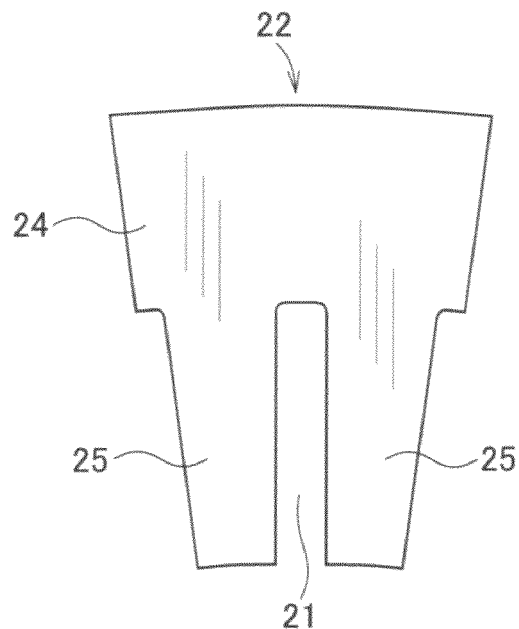
FIG. 4 is a plan view illustrating a segment core used for the stator core.

FIG. 4 is a plan view illustrating a segment core 22 used for the stator core 20. A predetermined number (twenty-four in the present embodiment) of segment cores 22 shown in FIG. 4 are circumferentially connected to form the stator core 20. Each segment core 22, per se, defines one slot 21 therein, while two adjacently located segment cores 22 define one slot 21 therebetween. Specifically, each segment core 22 includes a pair of tooth portions 25 extending in the radial direction, and a back core portion 24 connecting the tooth portions 25 on radially outer sides of the tooth portions.

The segment cores 22 configuring the stator core 20 are each formed by laminating a plurality of electromagnetic steel plates with an insulating film being interposed therebetween. The segment core 22 may be a laminated body formed of not only the electromagnetic steel plates and insulating films but also well-known metal films and insulating films.

Figure 5:
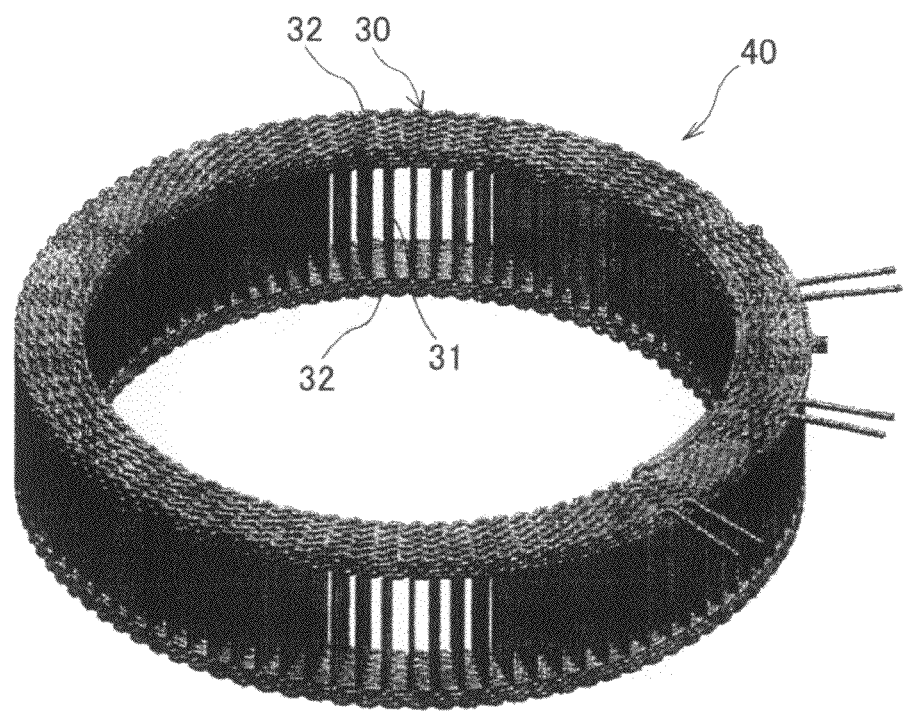
FIG. 5 is a perspective view illustrating an appearance of a stator winding used for the stator.
Figure 7:
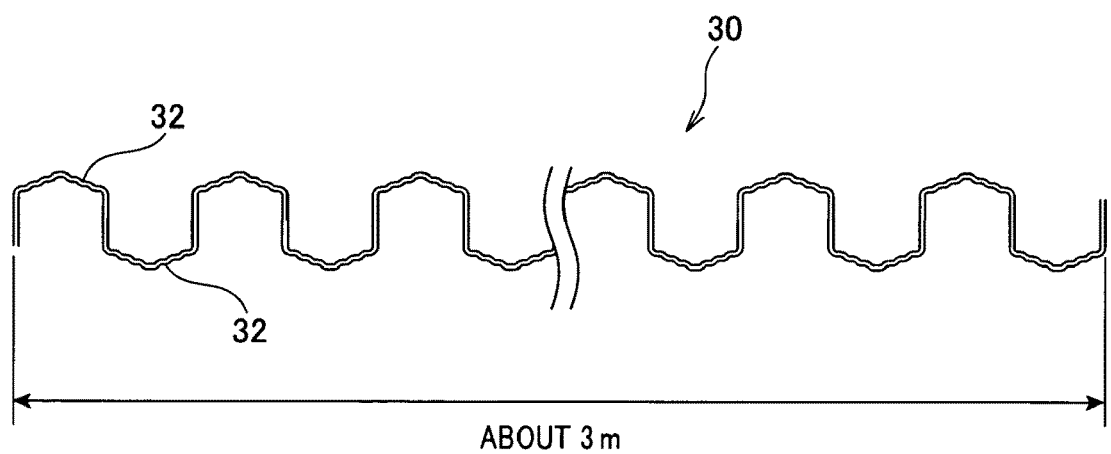
FIG. 7 is a front view illustrating a general configuration of a wire member used for the stator.

FIG. 5 is a perspective view illustrating an appearance of the stator winding 40 used for the stator 10. FIG. 7 is a front view illustrating a general configuration of a wire member 30. As can be seen from FIG. 5, the appearance as a whole has a substantially cylindrical shape. In order to form the stator winding 40, a band of wire-member assembly is formed first with a plurality of wire members 30 (twelve in the present embodiment) each having a wave form as shown in FIG. 7. The band of wire-member assembly is formed by weaving or building up the plurality of wire members 30 using a predetermined method. Then, the wire-member assembly is convolutely rolled up to form the stator winding 40. As shown in FIG. 7, each of the wire members 30 of the stator winding 40 has a length of about 3 m, with a plurality of turn portions 32 being formed at a predetermined pitch.

Figure 8A:
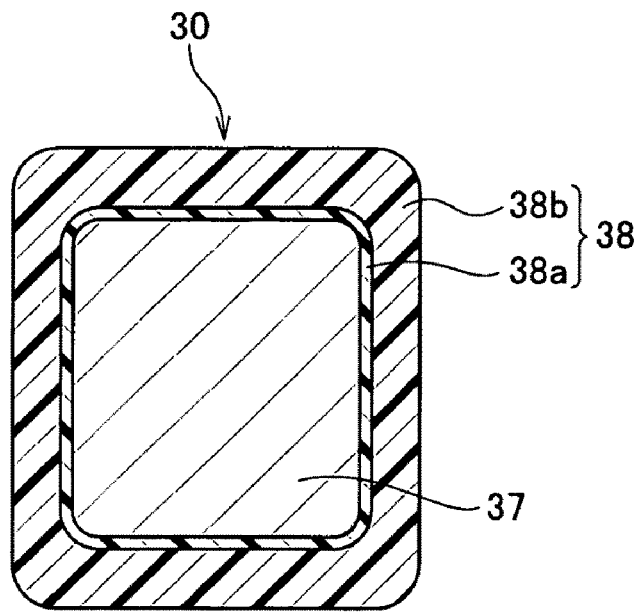
FIG. 8A is a cross-sectional view illustrating the wire member used for the stator according to the first embodiment.

FIG. 8A is a cross-sectional view illustrating the wire member 30 of the present embodiment. As shown in FIG. 8A, the wire member 30 is formed of a copper conductor 37, and an insulating coating 38 consisting of an inner layer 38a and an outer layer 38b. The insulating coating 38 covers the outer periphery of the conductor 37 to insulate the conductor 37. Specifically, the inner layer 38a covers the outer periphery of the conductor 37 and the outer layer 38b covers the outer periphery of the inner layer 38a. The thickness of the insulating coating 38, i.e. the total thickness of the inner and outer layers 38a and 38b, is set so as to fall within a range of from 100 μm to 200 μm.

The outer layer 38b is made of an insulating material. The inner layer 38a is made of an insulating material, such as a thermoplastic resin having a higher glass-transition temperature than the outer layer 38b or a polyamide-imide having no glass-transition temperature. Thus, the outer layer 38b of the insulating coating 38 is crystallized faster than the inner layer 38a by the heat generated in the rotary electric machine. Accordingly, the outer layer 38b will have a higher surface hardness so that the wire member 30 becomes unlikely to be damaged. Thus, the insulation can be ensured in the wire member 30 which has been processed to provide steps in each of the turn portions 32.

Figure 6:
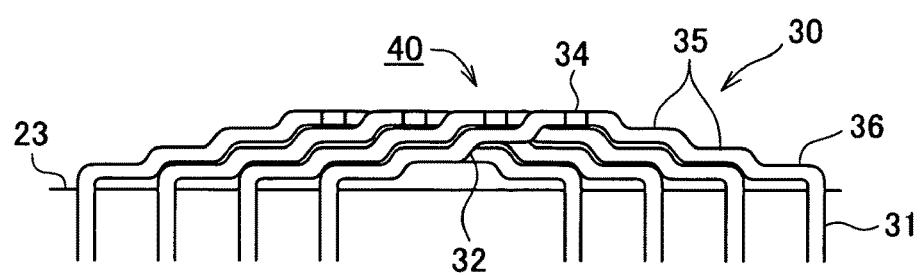
FIG. 6 is a front view illustrating a coil end of the stator winding.

FIG. 6 is a front view illustrating a coil end of the stator 10. As shown in FIGS. 2 and 6, each wire member 30 has linear slot accommodation portions (i.e. straight portions) 31 and the turn portions 32. The slot accommodation portions 31 are each disposed in the slot 21a or 21b of the stator core 20 when the stator winding 40 is wound about the stator core 20. The turn portion 32 is projected out of the stator core 20 from the slots 21a and 21b to connect the slot accommodation portions 31 which are disposed in circumferentially different slots. Each of the wire members 30 is wound about the stator core 20 by wave winding to form the stator winding 40. The turn portions 32 are projected out of the stator core 20 on both axial ends of the stator core 20. The portion connecting between the slot accommodation portion 31 and the turn portion 32 is substantially bent at a right angle to provide a step portion which will be described later.

Figure 9:
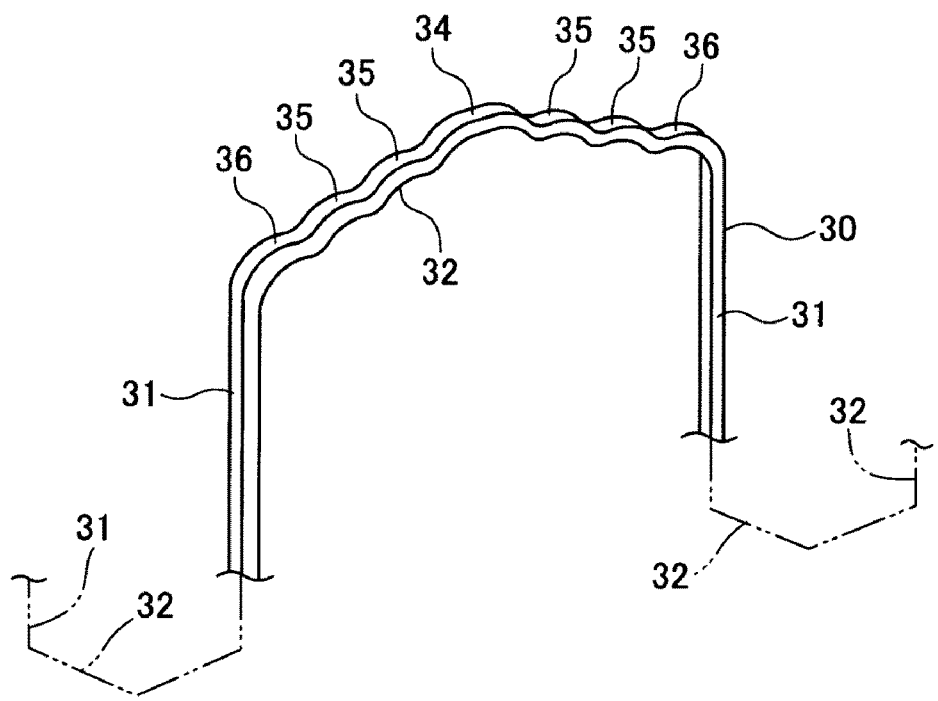
FIG. 9 is a perspective view illustrating the configuration of a turn portion of the wire member according to the first embodiment.

FIG. 9 is a perspective view illustrating the configuration of the turn portion 32 of the wire member 30. As shown in FIG. 9, a crank portion 34 with no twist is formed at substantially the center of the turn portion 32. The crank portion 34 is formed into a crank shape so as to be substantially parallel to an end face 23 of the stator core 20. The offset caused by the shape of the crank portion 34 substantially corresponds to the width of the wire member 30. Owing to this offset, so the wire member 30 can be wound up so that the turn portions 32, which are adjacent to each other in the radial direction, are tightly close to each other. As a result, the radial width of each coil end is reduced to thereby prevent the stator winding 40 from being jutted out in the radial direction.

The turn portion 32 has base portions projected out of the stator core 20 from the slots 21a and 21b (hereinafter referred to as "projected base portions"). In these projected base portions, respective step portions 36 are formed starting from the respective slots across which the wire member 30 is bridged. The projected base portions are each substantially parallel to each axial end face 23 of the stator core 20. Meanwhile, the distance between the projected base portions of each turn portion 32 of the wire member 30, which are projected from the slots 21a and 21b, or, in other words, the length of the base of the triangle formed by the turn portion 32, is made smaller than the distance between the slots across which the wire member 30 is bridged. As a result, a height h of each coil end can be reduced.

Also, it is ensured that a relation $d1 \leq d2$ is established, where d1 is the length of each step portion 36 extending substantially parallel to the end face 23 of the stator core 20, and d2 is the distance between the circumferentially adjacent slots. Thus, the occurrence of interference can be prevented between each step portion 36 of the wire member 30 and the wire member 30 projected from the slot which is circumferentially adjacent to the step portion 36. In this way, the height of each coil end and the radial width of each coil end can be prevented from being increased, which would have otherwise been increased in order to avoid the interference between the portions of the wire member 30 projected from the circumferentially adjacent slots. As a result, the height of each coil end can be reduced. Further, owing to the small radial width of each coil end, the stator winding 40 can be prevented from being jutted out in the radial direction.

The wire member 30 is provided with two crank portions 35 between the crank portion 34 located at substantially the center of the turn portion 32 and the step portion 36 formed at each projected base portion of the turn portion 32. Specifically, each of the turn portions 32 of the wire member 30 on one axial end face 23 of the stator core 20 has two step portions 36 and a total of five crank portions. Thus, the height h of the turn portion 32 is reduced compared to the height of a triangular turn portion having no crank portions. Similar to the step portions 36 and the crank portion 34, each of the crank portions 35 is formed so as to be substantially parallel to each end face 23 of the stator core 20. Thus, in each turn portion 32 of the wire member 30, staircase patterns are formed sandwiching the crank portion 34.

Figure 10:
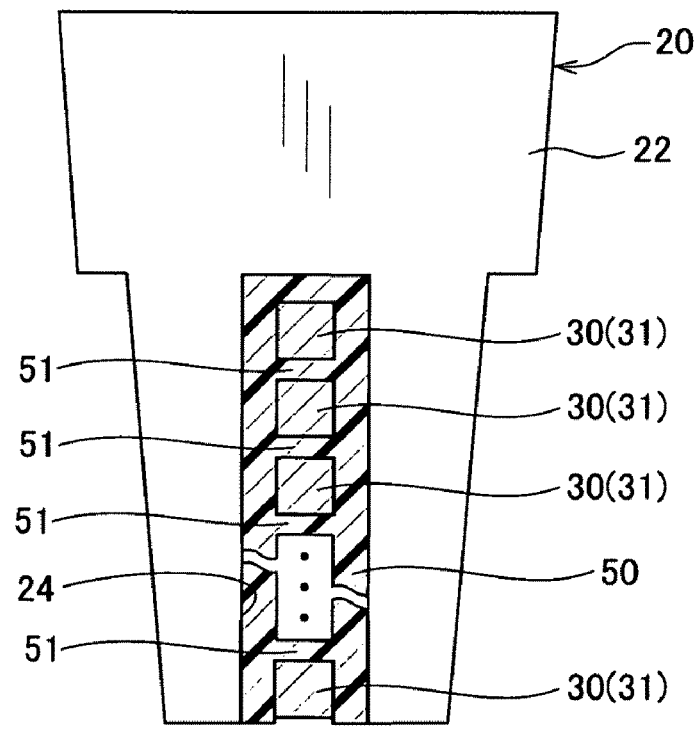
FIG. 10 is a schematic explanatory view illustrating an adhered state of the wire members disposed in a slot, according to the first embodiment.

FIG. 10 is a schematic explanatory view illustrating an adhered state of the wire members 30 disposed in the slot 21. As shown in FIG. 10, the slot accommodation portions 31 of the plurality of wire members 30 are accommodated inside each slot 21 of the stator core 20. Specifically, the slot accommodation portions 31 of the twelve wire members 30 are disposed in each slot 21 in the state of being is aligned in the radial direction of the stator core 20. In FIG. 10, in order to clarify the structure inside the slot 21, only one segment core 22 is illustrated in detail and only four of the twelve wire members 30 are schematically illustrated omitting the intermediate eight wire members 30. In disposing the wire members 30, an adhesive member 50 is used, which is composed of an adhesive material or an adhesive layer, for example.

The slot accommodation portions 31 of the wire members 30 disposed in the slot 21 are supported by the adhesive member 50. The adhesive member 50 is arranged between each of the slot accommodation portions 31 and a peripheral wall surface 24 of the slot 21 (hereinafter just referred to "peripheral wall surface 24") of the stator core 20, filling the spaces therebetween. Thus, the plurality of slot accommodation portions 31 are adhered to the peripheral wall surface 24 by the adhesive member 50 to obtain support. In each slot 21, another adhesive member 51 is filled between adjacent slot accommodation portions 31 and integrated with the adhesive member 50. Thus, the plurality of slot accommodation portions 31 accommodated in the slot 21 are also adhered to each other for integration by the adhesive member 51. The thickness of the adhesive member 51 arranged between the opposed faces of the adjacent slot accommodation portions 31 is adapted to be smaller than the thickness of the adhesive member 50 arranged between the opposed faces of each of the slot accommodation portions 31 and the peripheral wall surface 24. Thus, the space efficiency of the wire members 30 disposed in the slot 21 is improved, whereby the space factor is suppressed from being lowered.

Figure 11:
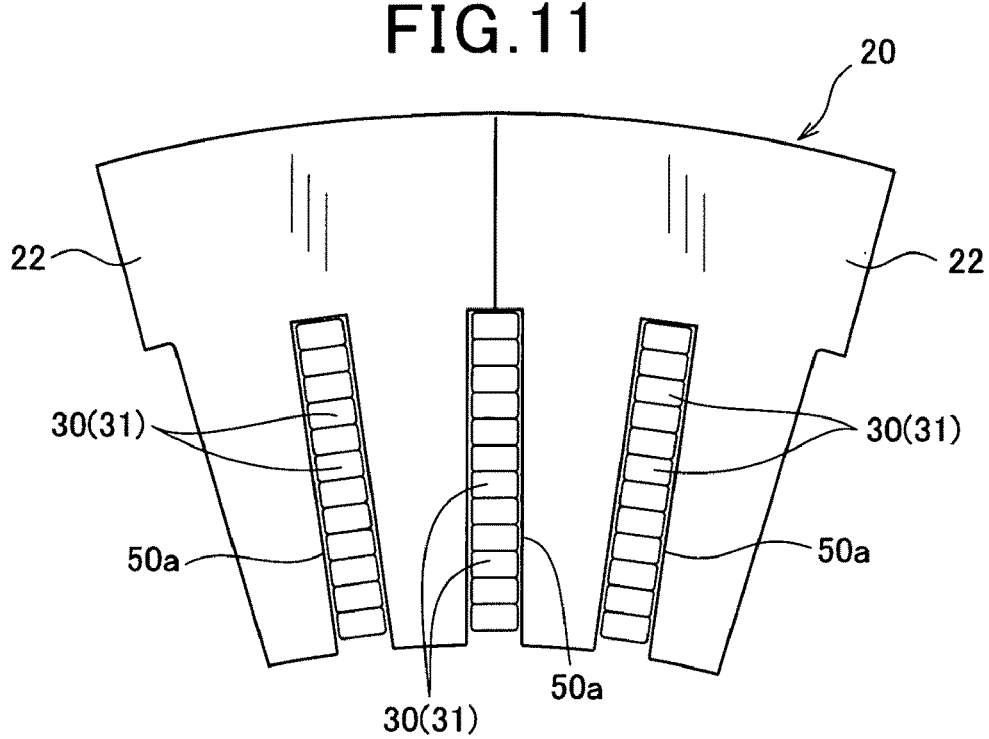
FIG. 11 is an explanatory view illustrating a state of an adhesive sheet disposed in a slot before being heated, according to the first embodiment.

As the adhesive members 50 and 51, an adhesive sheet 50a is used. The adhesive sheet 50a is formed by mixing beads, each sealing a gas therein, into an acryl that is a thermoplastic resin, and by shaping the mixture into a sheet. FIG. 11 is an explanatory view illustrating a state of the adhesive sheet 50a disposed in the slot 21 before being heated. As shown in FIG. 11, the adhesive sheet 50a is disposed in a gap between the opposed faces of each of the wire members 30 and the peripheral wall surface 24. Then, the adhesive sheet 50a is heated and expanded, followed by curing to form the adhesive members 50 and 51. As shown in FIG. 10, the adhesive member 50 is arranged along the peripheral wall surface 24 so that the cross section of the adhesive member 50 has a U-shaped form. The adhesive member 50, being extended throughout the peripheral wall surface 24, adheres to the entire areas of two faces of each slot accommodation portion 31, which faces are opposed to the peripheral wall surface 24. The adhesive sheet 50a, when it is permitted to expand, enters the gap between the opposed faces of adjacent slot accommodation portions 31 to thereby form the adhesive member 51. Thus, the adhesive member 51 adheres to the entire areas of the respective opposed faces of the adjacent slot accommodation portions 31.

Figure 14:
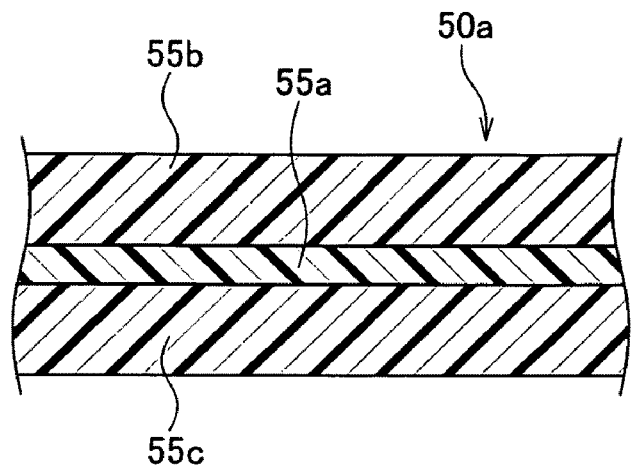
FIG. 14 is a partial cross-sectional view illustrating the adhesive sheet.
Figure 15:
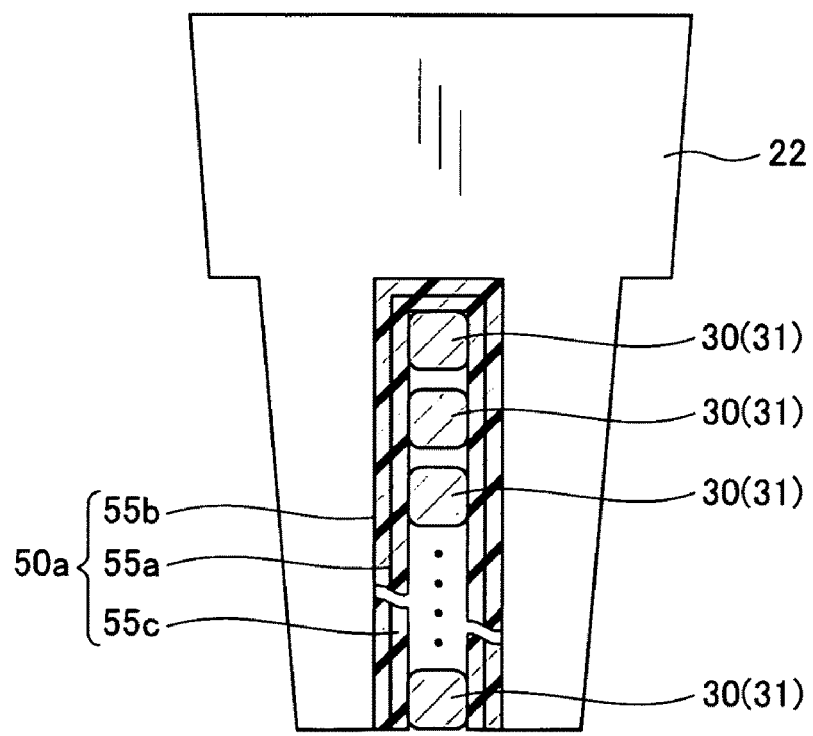
FIG. 15 is a schematic explanatory view, similar to the view of FIG. 10, illustrating an adhered state of the wire members disposed in a slot, according to the first embodiment.

FIG. 14 is a cross-sectional view of the adhesive sheet 50a used as the adhesive member 50. FIG. 15 is a schematic explanatory view illustrating, in a manner similar to FIG. 10, the adhered state of the wire members 30 disposed in the slot 21.

The adhesive sheet 50a has a three-layer structure consisting of an insulating layer 55a and adhesive layers 55b and 55c stacked on both surfaces of the insulating material member 55a. The insulating layer 55a is formed of a film, such as PET, PPS or PEN. The adhesive layers 55b and 55c are each made of a resin material. The resin materials to be used for the adhesive layers 55b and 55c include acryl and other thermoplastic resins. Beads, each sealing a gas therein, may be mixed into the resin forming the adhesive layers 55b and 55c to make the resin foamable. As mentioned above, the adhesive sheet 50a is formed along the peripheral wall surface 24 so that the cross section of the adhesive sheet 50a has a U-shaped form.

One adhesive layer 55b of the adhesive sheet 50a is ensured to adhere to the entire area of the peripheral wall surface 24. The other adhesive layer 55c is ensured to adhere to the entire areas of the two faces of each slot accommodation portion 31, which faces are opposed to the peripheral wall surface 24. In particular, the slot accommodation portion 31 disposed radially outermost in the slot 21 has three faces facing the peripheral wall surface 24. Accordingly, the entire areas of the three faces are adhered to the adhesive layer 55c. Thus, since the adhesive layer 55c is adhered to at least two faces of each of the slot accommodation portion 31, the adhesive strength of the individual slot accommodation portions 31 against the peripheral wall surface 24 is well ensured. In this way, the individual slot accommodation portions 31 are supported in the state of being strongly adhered to the peripheral wall surface 24.

The adhesion planes between each of the slot accommodation portions 31 and the adhesive layer 55c are aligned in the radial direction. These adhesion planes are opposed to the adhesion plane between the adhesive layer 55b and the peripheral wall surface 24. Thus, the adhesion area between the adhesive layer 55c and the individual slot accommodation portions 31 can be enlarged. At the same time, the adhesive sheet 50a can be shaped into a simplified form having a U-shaped cross section and extending along the peripheral wall surface 24.

The adhesive sheet 50a having the insulating layer 55a is disposed between each of the slot accommodation portions 31 and the peripheral wall surface 24. Specifically, the insulating layer 55a of the adhesive sheet 50a is present between the opposed faces of each of the slot accommodation portions 31 and the peripheral wall surface 24. Therefore, good insulation can be ensured between them.

The wire member 30 used in the present embodiment is applied with the insulating coating 38 having a thickness ranging from 100 μm to 200 μM with good insulation properties.

Figure 12:
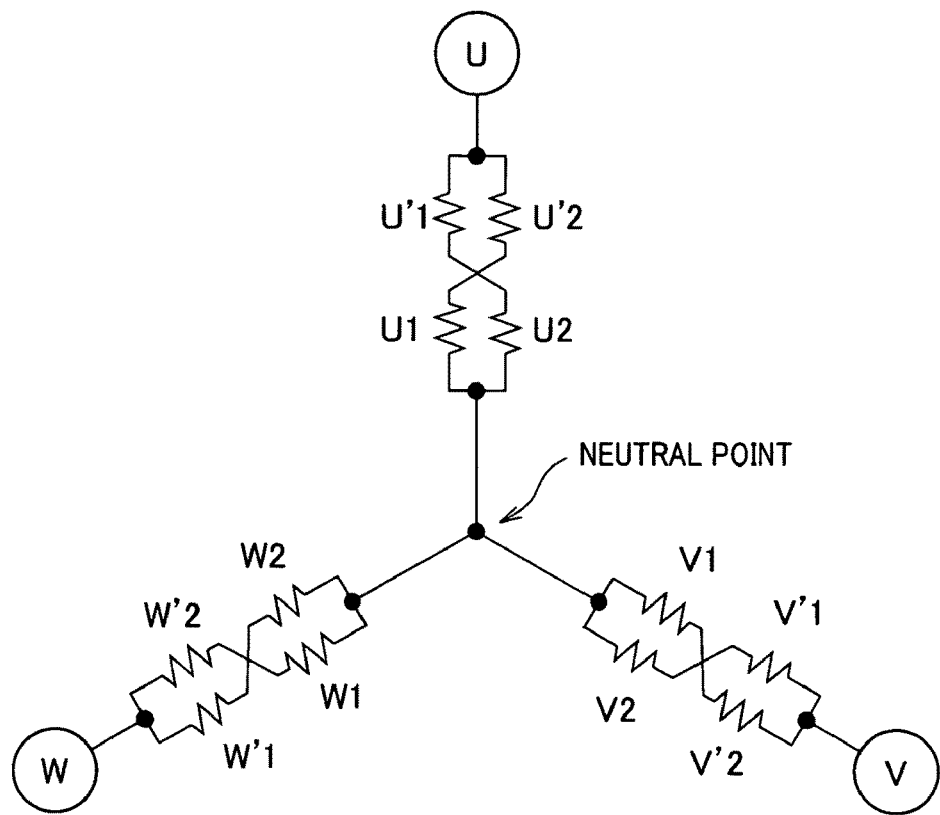
FIG. 12 is an explanatory view illustrating connection of the stator winding according to the first embodiment.

FIG. 12 is an explanatory view illustrating connection of the stator winding 40 used in the first embodiment. As shown in FIG. 12, the stator winding 40 is formed of three-phase windings each consisting of two windings (U1, U2, V1, V2, W1 and W2). The wire members 30 configuring the stator winding 40 are shaped into a form using wave winding so as to extend along the inner periphery of the stator core 20 in the circumferential direction. The slot-accommodation portions 31 are accommodated in every predetermined ordinal slot 21 (in the present embodiment, every sixth slot 21 as calculated from: 3 (phases)×2 (slots)=6 (slots)). The turn portions 32 are formed, being projected from each axial end face of the stator core 20. The turn portions 32 projected from both axial end faces of the stator core 20 form respective coil ends of the stator winding 40.

The stator winding 40 is formed by winding the plurality of wire members 30 in the circumferential direction into a wave form, with one end, i.e. a first end, of each of the wire members 30 being projected from an axial end face of the stator core 20 on the outermost side of each slot 21. The other end, i.e. a second end, of each of the plurality of wire members 30 is projected from the axial end face of the stator core on the innermost side of the slot 21, in the same direction as the first end. Two wire members 30 are wound about the same one slot 21. Two slot accommodation portions 31 accommodated in the same one slot 21 are disposed such that the depthwise location thereof will be alternated with or be the same as the location of the two accommodation portions 31 disposed in the circumferentially adjacent slot 21. It should be appreciated that the arrangement of the two wire members 30 may depend on the method of winding.

In the stator winding 40, the ends of the winding of the same phase (U1 and U2, V1 and V2, W1 and W2) are connected to each other via connecting portions. The connecting portions are ensured to be more projected from the stator core 20 than the end face of the turn portions 32 (i.e. than the end face of the coil end).

The stator winding 40 is formed by circumferentially winding the plurality of wire members 30 into a wave form, with the first end of each of the wire members 30 being projected from the outermost side of an axial end face of the stator core 20. In this case, the wire members 30 are wound up from the radially outward direction toward the radially inward direction. The second ends of the wire members 30 are projected from the innermost side of the end face of the stator winding 40.

The stator of the present embodiment configured as described above is manufactured by sequentially performing: a stator winding fabrication process of fabricating the stator winding 40; an adhesive sheet disposing process; an assembling process of assembling the stator winding 40 into the stator core 20; and an adhering process of adhering the slot accommodation portions 31 of the wire members 30 to the peripheral wall surface 24 via the adhesive sheet.

In the stator winding fabrication process, the twelve wire members 30 each formed into a wave form, as shown in FIG. 7, are woven using a given method to form a band of wire-member assembly. Then, the wire-member assembly is convolutely wound up to fabricate the cylindrical stator winding 40 shown in FIG. 2. In this case, the stator winding 40 is formed such that the slot accommodation portions 31 of the twelve wire members 30 to be accommodated in the same one slot 21 of the stator core 20 are aligned in the radial direction.

Figure 13A:
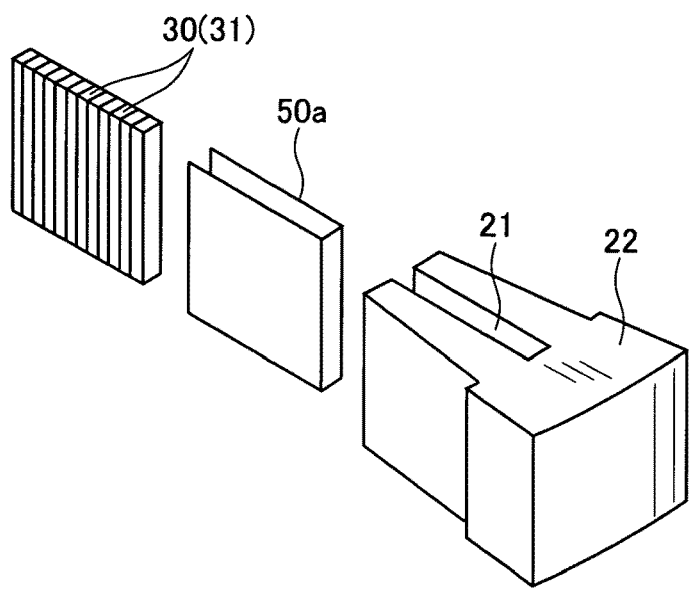
FIGS. 13A and 13B are explanatory views, each illustrating a process of disposing the adhesive sheet in a method of manufacturing the stator according to the first embodiment.
Figure 13B:
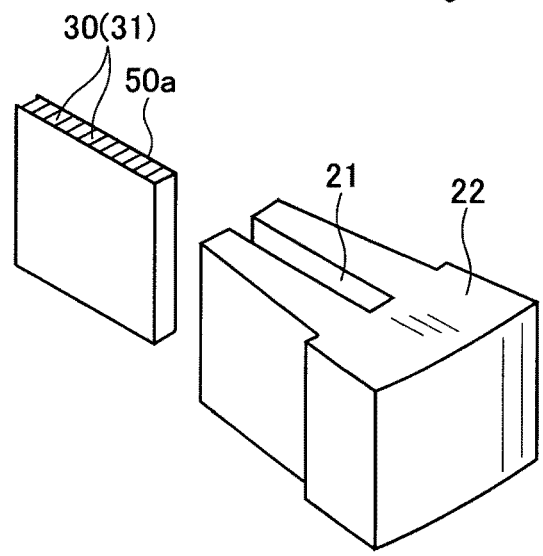

FIGS. 13A and 13B show the adhesive sheet disposing process. As shown in FIGS. 13A and 13B, before accommodating the slot accommodation portions 31 of the twelve wire members 30 in the slot 21, the thermally expandable adhesive sheet 50*a* is shaped into a form thinner than the gap between each of the slot accommodation portions 31 and the peripheral wall surface 24. The adhesive sheet 50*a* is bent into a U-shaped form and disposed along the outer peripheral faces of the twelve slot accommodation portions 31 aligned in the radial direction. In this case, the adhesive sheet 50*a* may not be disposed along the outer peripheral faces of the twelve slot accommodation portions 31, but may be disposed along the peripheral wall surface 24 of the slot 21.

Figure 13C:
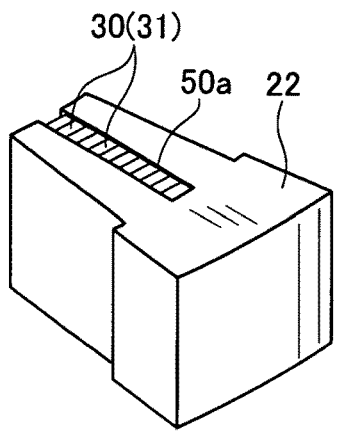
FIG. 13C is an explanatory view illustrating a process of assembling the adhesive sheet.

FIG. 13C shows the subsequent assembling process. As shown in FIG. 13C, the stator winding 40 and the stator core 20 are assembled so that the radially aligned twelve slot accommodation portions 31 are accommodated in a predetermined slot 21 of the stator core 20. Thus, the adhesive sheet 50*a* is positioned between the radially aligned twelve slot accommodation portions 31 and the peripheral wall surface 24 of the slot 21.

In the subsequent adhering process, the adhesive sheet 50*a* is heated and expanded. Thus, the gap between each of the slot accommodation portions 31 and the peripheral wall surface 24 and the gaps between the mutually adjacent slot accommodation portions 31 are filled with the adhesive sheet 50*a* and resin, so that the gaps are eliminated. Then, in the state where the claps are eliminated, the adhesive sheet 50*a* and resin are cured. With this expansion, the adhesive member 50 is formed by the adhesive sheet 50*a* disposed between each of the slot accommodation portions 31 and the peripheral wall surface 24. At the same time, the adhesive members 51 are formed by the adhesive sheet 50*a* that has entered between the mutually adjacent slot accommodation portions 31. These adhesive members 50 and 51 can achieve strong adhesion between each of the twelve slot accommodation portions 31 accommodated in the slot 21 and the peripheral wall surface 24 of the slot 21 to thereby support the slot accommodation portions 31.

As described above, according to the stator and the method of manufacturing the stator of the present embodiment, the plurality of slot accommodation portions 31 disposed in each slot 21 are adhered to the peripheral wall surface 24 of the slot 21 via the adhesive member 50. The slot accommodation portions 31 are also mutually adhered to each other by the adhesive member 51.

Specifically, as shown in FIG. 10, the adhesive member 50 is disposed so as to have a U-shaped cross section and extend along the peripheral wall surface 24 of the slot 21. In this case, the adhesive member 50 is adhered to the entire area of the peripheral wall surface 24 and the entire areas of the faces of the individual slot accommodation portions 31, which faces are opposed to the peripheral wall surface 24. Also, when the adhesive sheet 50*a* expands, each gap between the opposed faces of the radially adjacent slot accommodation portions 31 is filled with resin, forming the adhesive member 51. Thus, the entire areas of these opposed faces of the radially adjacent slot accommodation portions 31 are mutually adhered for integration.

As described above, the adhesiveness of the adhesive members 50 and 51 can suppress the vibration of the wire members 30, which is generated during the operation of the rotary electric machine to reliably reduce the rasping and peculiar noise or magnetic noise.

In the present embodiment, the adhesive sheet 50*a* has the three-layer structure consisting of the insulating layer 55*a* and the adhesive layers 55*b* and 55*c*. Accordingly, in addition to the insulating coating 38 of the wire member 30, per se, the insulating layer 50*a* of the adhesive member 50 is interposed between each of the slot accommodation portions 31 and the peripheral wall surface 24 of the slot 21. Therefore, insulation is more reliably achieved between each of the slot accommodation portions 31 and the peripheral wall surface 24.

In the present embodiment, a thermally expandable thermoplastic resin is used as the adhesive sheet 50*a*. Alternatively, other resins may be used, such as thermally expandable thermosetting resins, as well as non-thermally expandable thermosetting resins and thermoplastic resins. For example, when a non-thermally expandable resin is used, the thickness of the adhesive sheet 50*a* is made slightly thicker than the gap formed between each of the slot accommodation portions 31 and the peripheral wall surface 24 when the slot accommodation portions 31 are accommodated in the slot 21. Then, in the assembling process of assembling the stator winding 40 into the stator core 20, the slot accommodation portions 31 are press-fitted into the corresponding slot 21, for accommodation. Then, in the adhering process, the adhesive sheet 50*a* is heated for melting or solidified, whereby the slot accommodation portions 31 can be adhered to the peripheral wall surface 24.

(Second Embodiment)

Figure 16:
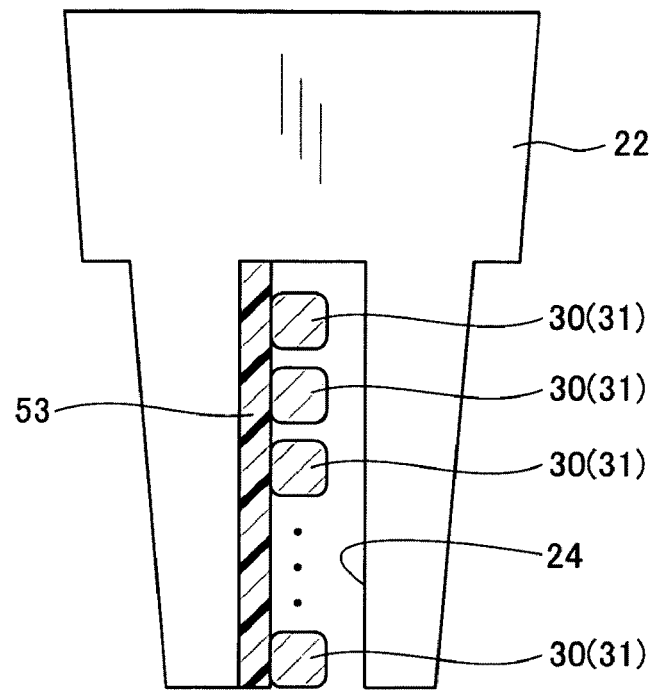
FIG. 16 is a schematic explanatory view, similar to the view of FIG. 10, illustrating an adhered state of wire members disposed in a slot, according to a second embodiment.

With reference to FIG. 16, hereinafter is described a second embodiment of the present invention. In the second and the subsequent embodiments, the components identical with or similar to those in the first embodiment are given the same reference numerals for the sake of omitting explanation.

FIG. 16 is a schematic explanatory view, similar to the view of FIG. 10, illustrating an adhered state of the wire members 30 disposed in so each slot 21, according to the second embodiment. The second embodiment uses an adhesive member 53. The adhesive member 53 adheres the slot accommodation portions 31 of the wire members 30 disposed in each slot 21 to the peripheral wall surface 24 of the stator core 20. However, unlike the first embodiment, the adhesive member 53 is disposed in one of the two gaps each formed between each of the slot accommodation portions 31 and the peripheral wall surface 24. Specifically, of the peripheral wall surface 24 having a U-shaped cross section, the adhesive member 53 is adhered to the wall surface on only one side. At the same time, the adhesive member 53 is adhered to the faces of the twelve slot accommodation portions 31, which faces are opposed to the wall surface on one side. Accordingly, each of the twelve slot accommodation portions 31 is in a cantilevered state, being adhered to and supported by the wall surface on one side of the peripheral wall surface 24. Similar to the adhesive sheet 50a, the adhesive member 53 has the three-layer structure.

The second embodiment is also different from the first embodiment in that no material corresponding to the adhesive member 51 is provided to achieve mutual adhesion between adjacently located slot accommodation portions 31.

According to the stator of the second embodiment configured as described above, the adhesive member 53 is used to achieve adhesion between each of the slot accommodation portions 31 of the wire members 30 disposed in each slot 21 and the peripheral wall surface 24 of the stator core 20. Therefore, the vibration of the wire members 30, which is generated during the operation of the rotary electric machine, can be suppressed to thereby reliably reduce the rasping and peculiar noise or magnetic noise. Further, use of a small amount of the adhesive member 53 can contribute to reducing the cost.

In the second embodiment as well, the adhesion planes between the adhesive member 53 and each of the slot accommodation portions 31 are radially aligned with respect to the stator core 20 and are opposed to the adhesion plane between the adhesive member 53 and the peripheral wall surface 24. Thus, the adhesion area of the adhesive member 53 can be enlarged. At the same time, the adhesive sheet 50a can be shape into a simplified form extending along the plane of the wall surface on one side of the peripheral wall surface 24.

In the second embodiment, the adhesion area of the adhesive member 53 with respect to the slot accommodation portions 31 and the peripheral wall surface 24 is small compared to the adhesion area in the first embodiment. Therefore, the effect of suppressing vibration of the wire members 30 cannot be expected to be better than that achieved in the first embodiment. However, good vibration suppression effect for the wire members 30 can still be expected by supporting only a portion of each of the slot accommodation portions 31, using the adhesive member 53.

(Third Embodiment)

Figure 17:
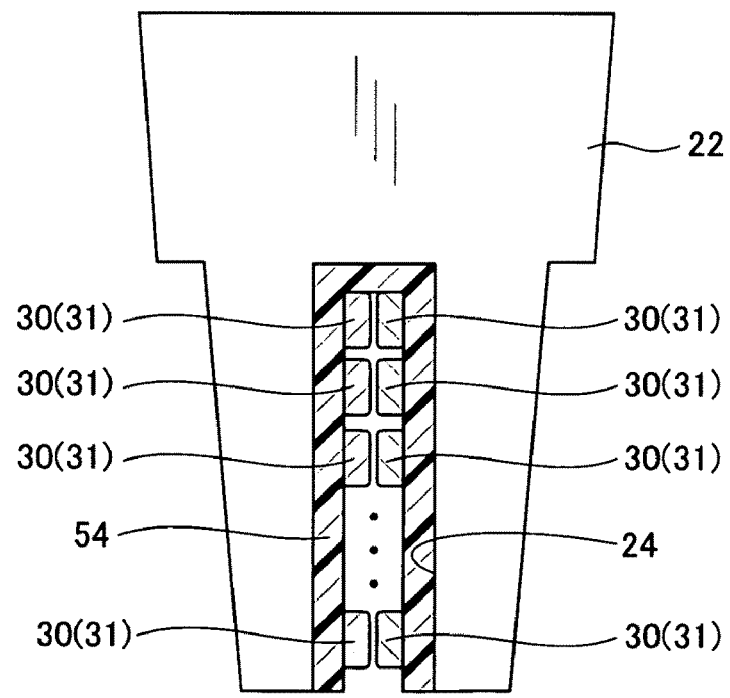
FIG. 17 is a schematic explanatory view, similar to the view of FIG. 10, illustrating an adhered state of wire members disposed in a slot, according to a third embodiment.

With reference to FIG. 17, hereinafter is described a third embodiment of the present embodiment. FIG. 17 is a schematic explanatory view, similar to the view of FIG. 10, illustrating an adhered state of the wire members 30 disposed in each slot 21, according to the third embodiment.

The third embodiment uses an adhesive member 54 for the stator 10. Unlike the first embodiment, the stator 10 of the third embodiment has a structure in which a total of twenty-four slot accommodation portions 31 of the wire members 30 are arranged in two rows in each slot 21. In each of the rows, twelve slot accommodation portions 31 are aligned. Although not shown in FIG. 17, each of the twenty-four wire members 30 is thinner than each wire member 30 in the first embodiment. However, similar to the first embodiment, each wire member 30 consists of the conductor 37 having a rectangular cross section and the insulating coating 38 covering the outer periphery of the conductor 37.

The adhesive member 54 of the third embodiment has a U-shaped form extending along the peripheral wall surface 24 and disposed in the gap between each of the slot accommodation portions 31 and the peripheral wall surface 24. Specifically, the adhesive member 54 has an outer surface adhered to the entire area of the peripheral wall surface 24 and an inner surface adhered to the entire area of the face of each of the slot accommodation portions 31 which are opposed to the peripheral wall surface 24.

Thus, the twenty-four slot accommodation portions 31 are adhered to and supported by the peripheral wall surface 24 via the adhesive member 54. The two slot accommodation portions 31 located radially outermost in each slot 21 are adhered to the adhesive member 54 through three faces thereof. The remaining twenty-two slot accommodation portions 31 are each adhered to the adhesive member 54 through only one face thereof. Accordingly, the twenty-two slot accommodation portions 31 are in a cantilevered state, being adhered to and supported by the wall surface on one side of the peripheral wall surface 24. It should be appreciated that, similar to the adhesive sheet 50a of the first embodiment, the adhesive member 54 has the three-layer structure.

The third embodiment is also different from the first embodiment in that no material corresponding to the adhesive member 51 is provided to achieve mutual adhesion between adjacently located slot accommodation portions 31.

According to the stator of the third embodiment configured as described above, the adhesive member 54 achieves adhesion between all the twenty-four slot accommodation portions 31 arrange in two rows in each slot 21 and the peripheral wall surface 24 of the stator core 20. Therefore, similar to the first embodiment, the vibration of the wire members 30, which is generated during the operation of the rotary electric machine, can be suppressed to reliably reduce the rasping and peculiar noise or magnetic noise.

In the third embodiment as well, the adhesion planes between the adhesive member 54 and each of the slot accommodation portions 31 are radially aligned with respect to the stator core 20 and are opposed to the adhesion plane between the adhesive member 54 and the peripheral wall surface 24. Thus, the adhesion area of the adhesive member 54 can be enlarged. At the same time, the adhesive sheet 50a can be shaped into a simplified form so as to extend in a U-shaped form along the peripheral wall surface 24.

(Fourth Embodiment)

Figure 8B:
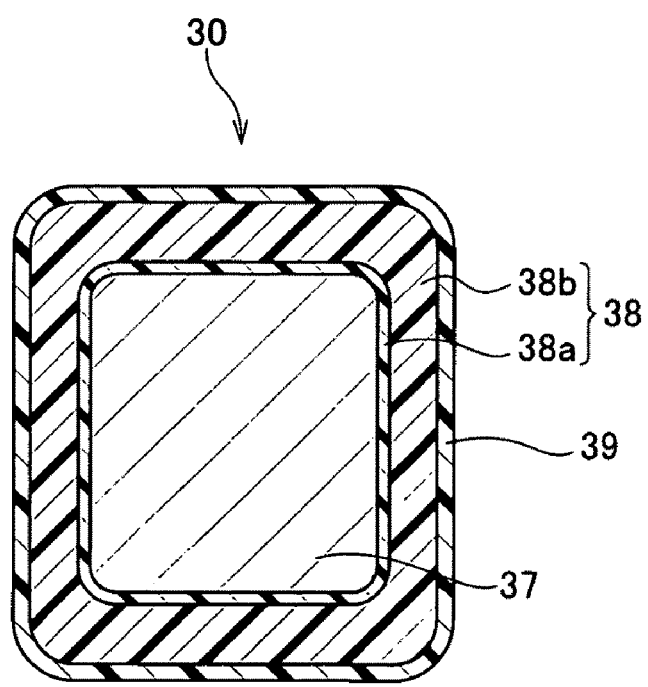
FIG. 8B is a cross-sectional view illustrating a wire member used for a stator according to a fourth embodiment of the present invention.
Figure 18:
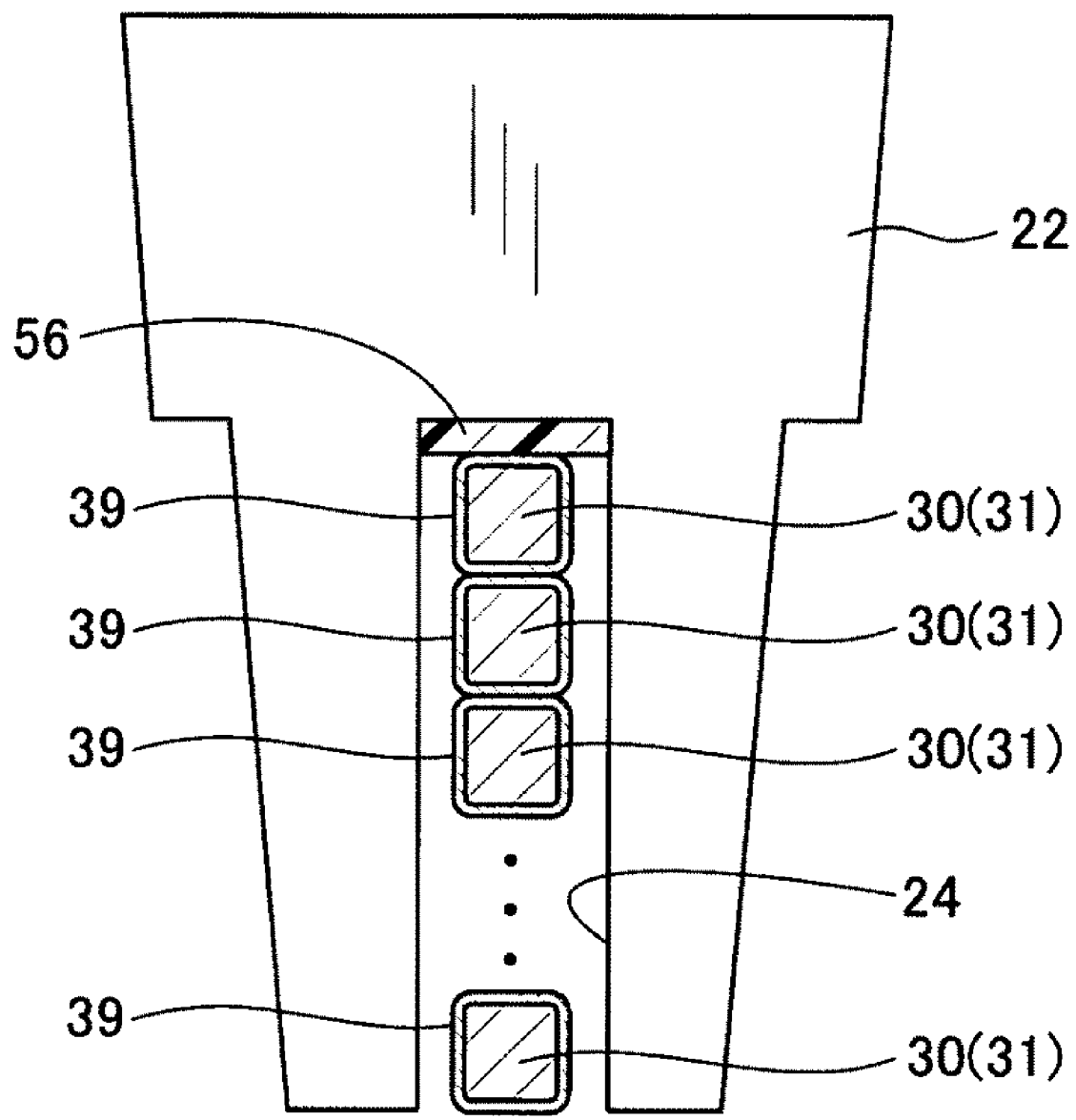
FIG. 18 is a schematic explanatory view, similar to the view of FIG. 10, illustrating an adhered state of wire members disposed in a slot, according to the fourth embodiment.

With reference to FIG. 18, hereinafter is described a fourth embodiment of the present invention. FIG. 18 is a schematic explanatory view, similar to the view of FIG. 10, illustrating an adhered state of the wire members 30 disposed in each slot 21, according to the fourth embodiment. The fourth embodiment is different from the first embodiment in that the wire member 30 as illustrated in FIG. 8B is used. Use of the wire member 30 shown in FIG. 8B can reduce, as much as possible, the amount of an adhesive member 56 for adhering the slot accommodation portions 31 to the peripheral wall surface 24. As shown in FIG. 5B, the wire member 30 used in the fourth embodiment is different from the wire member 30 shown in FIG. 8A and used in the first to third embodiments in that the outer periphery of the insulating coating 38 consisting of the inner and outer layers 38a and 38b is covered with a fusing material 39 made of an epoxy resin or the like.

The fusing material 39 fuses faster than the insulating coating 38 by the heat generated in the rotary electric machine. Accordingly, the plurality of wire members 30 disposed in the same one slot 21 are allowed to thermally adhere to each other by the fusing material 39. As a result, the plurality of wire members 30 disposed in the same one slot are integrated and turn to a rigid body, whereby the mechanical strength of the wire members 30 in the slot 21 is enhanced.

The adhesive member 56 is disposed between the slot accommodation portion 31 which is located radially outermost in the slot 21 and the peripheral wall surface 24 to adhere the slot accommodation portion 31 in question to the peripheral wall surface 24. In this case, the adhesive member 56 achieves adhesion between the entire opposed surfaces of the slot accommodation portion 31 in question and the peripheral wall surface 24. Thus, the adhesive member 56 adheres to only one face of the slot accommodation portion 31 located radially outermost in the slot 21 among the twelve slot accommodation portions 31 disposed in the slot 21, allowing the slot accommodation portion 31 in question to be adhered to and supported by the peripheral wall surface 24. Meanwhile, the twelve slot accommodation portions 31 disposed in the slot 21 are in the state of being thermally adhered and integrated, as mentioned above, by the fusing material 39 that covers the outer peripheries of the slot accommodation portions 31. Therefore, all the twelve slot accommodation portions 31 are resultantly adhered to and supported by the peripheral wall surface 24 via the adhesive member 56. It should be appreciated that, similar to the adhesive sheet 50a of the first embodiment, the adhesive member 56 has the three-layer structure.

According to the stator of the present embodiment configured as described above, each slot accommodation portion 31 has the fusing material 39 covering the outer periphery of the insulating coating 38. Accordingly, the slot accommodation portions 31 disposed in the same one slot 21 can be easily thermally adhered to each other. As a result, the plurality of slot accommodation portions 31 disposed in the same one slot 21 are integrated, enhancing the mechanical strength of the wire members 30 in the slot 21. In this way, the occurrence of vibration in the wire members 30 can be effectively suppressed.

In addition, owing to the integration of the slot accommodation portions 31 achieved by the fusing material 39, the amount of the adhesive member 56 used for adhering the slot accommodation portions 31 to the peripheral wall surface 24 can be significantly reduced and thus the cost can be reduced.

The present invention may be embodied in several other forms without departing from the spirit thereof. The embodiments and modifications described so far are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A stator for a rotary electric machine comprising:
   an annular stator core that provides an axial direction along a center axis of the annular stator core, a radial direction radiating out from the axial direction into directions along a plane perpendicular to the axial direction, and a circumferential direction circulating around the axial direction centering on the axial direction, the annular stator core having a plurality of slots punched along the radial direction and arranged in the circumferential direction, each extending in the axial direction; and
   a stator winding formed by winding a plurality of wire members about the stator core, the wire members each including a conductor portion that has a rectangular cross section perpendicular to a longitudinal direction, and an insulating coating that covers an outer periphery of the conductor portion, with a plurality of straight portions of the wire members being accommodated and aligned in the radial direction in each slot, wherein:
   the stator comprises an adhesive member interposed between at least one straight portion among the plurality of straight portions accommodated in each slot and a surface of the slot to adhere the straight portion concerned to the stator core; and
   the adhesive member has a three-layer structure consisting of an insulating layer and adhesive layers laminated on both surfaces of the insulating layer.

2. The stator according to claim 1, wherein the adhesive member and the straight portions are adhered to each other in planes which are aligned in the radial direction in each slot.

3. The stator according to claim 2, wherein the adhesive member in each slot is adhered to at least two faces in the circumferential direction of each straight portion.

4. The stator according to claim 3, wherein the adhesive member is disposed along a wall surface of each slot so as to be in contact with the wall surface and the plurality of straight portions, being shaped into a form having a U-shaped cross section perpendicular to the axial direction.

5. The stator according to claim 4, wherein the stator comprises a different adhesive member interposed between the straight portions adjacent to each other in the radial direction in each slot to adhere the adjacent straight portions to each other.

6. The stator according to claim 5, wherein a thickness of the different adhesive member disposed between the adjacent straight portions is equal to or less than that of the adhesive member disposed between the straight portions and the wall surface of the slot.

7. The stator according to claim 5, wherein the insulating coating includes an inner layer and an outer layer that covers the inner layer and has a glass-transition temperature lower than that of the inner layer.

8. The stator according to claim 7, wherein the wire members each include a fusing material that covers an outer periphery of the insulating coating.

9. The stator according to claim 8, wherein:
   the wire members each have turn portions each connecting the straight portions projected out of both end portions in the axial direction of each of the plurality of slots, the turn portions being positioned outside in the axial direction of each of the end portions, in addition to the straight portions accommodated in each of the plurality of slots provided at different positions in the circumferential direction; and
   the turn portions each have base portions projected out of each of the plurality of slots, the base portions each being formed with a step portion extending substantially parallel to an end face of the stator core.

10. The stator according to claim 1, wherein the adhesive member in each slot is adhered to at least two faces in the circumferential direction of each straight portion.

11. The stator according to claim 1, wherein the adhesive member is disposed along a wall surface of each slot so as to be in contact with the wall surface and the plurality of straight portions, being shaped into a form having a U-shaped cross section perpendicular to the axial direction.

12. The stator according to claim 1, wherein the stator comprises a different adhesive member interposed between the straight portions adjacent to each other in the radial direction in each slot to adhere the adjacent straight portions to each other.

13. The stator according to claim 12, wherein a thickness of the different adhesive member disposed between the adjacent straight portions is equal to or less than that of the adhesive member disposed between the straight portions and the wall surface of the slot.

14. The stator according to claim 1, wherein the insulating coating includes an inner layer and an outer layer that covers the inner and has a glass-transition temperature lower than that of the inner layer.

15. The stator according to claim 1, wherein the wire members each include a fusing material that covers an outer periphery of the insulating coating.

16. The stator according to claim 1, wherein:
- the wire members each have turn portions each connecting the straight portions projected out of both end portions in the axial direction of each of the plurality of slots, the turn portions being positioned outside in the axial direction of each of the end portions, in addition to the straight portions accommodated in each of the plurality of slots provided at different positions in the circumferential direction; and
- the turn portions each have base portions projected out of each of the plurality of slots, the base portions each being formed with a step portion extending substantially parallel to an end face of the stator core.

17. A method of manufacturing the stator set forth in claim 1, the method comprising:
- fabricating a cylindrical stator winding using the plurality of wire members such that the straight portions of the plurality of wire members to be accommodated in the same one slot of the stator core are aligned in the radial direction;
- disposing a thermally expandable adhesive sheet having a thickness smaller than a gap between each of the plurality of straight portions and a wall surface defining each slot, the gap being formed when the straight portions are accommodated in the slot, the adhesive sheet being disposed along the wall surface of the slot or around the plurality of straight portions aligned in the radial direction;
- assembling the stator winding and the stator core such that the plurality of straight portions are accommodated in the slot determined in advance; and
- adhering the plurality of straight portions to the wall surface via the adhesive sheet by heating and expanding the adhesive sheet for the elimination of the gap between each of the plurality of straight portions and the wall surface of each slot.

18. A method of manufacturing the stator set forth in claim 1, the method comprising:
- fabricating a cylindrical stator winding using the plurality of wire members such that the straight portions of the plurality of wire members to be accommodated in the same one slot of the stator core are aligned in the radial direction;
- disposing an adhesive sheet having a thickness larger than a gap between each of the plurality of straight portions and a wall surface defining each slot, the gap being formed when the straight portions are accommodated in the slot, the adhesive sheet being disposed along the wall surface of the slot or around the plurality of straight portions aligned in the radial direction;
- assembling the stator winding and the stator core such that the plurality of straight portions are press-fitted to and accommodated in the slot determined in advance; and
- adhering the plurality of straight portions to the wall surface via the adhesive sheet by heating for melting, or solidifying the adhesive sheet.

* * * * *